Patented Apr. 28, 1936

2,038,839

UNITED STATES PATENT OFFICE 2,038,839

PRINTING INK

Karl Gross, Feuerbach, near Stuttgart, Germany

No Drawing. Application May 22, 1933, Serial No. 672,355. In Germany May 23, 1932

1 Claim. (Cl. 134—35)

My invention relates to printing inks for all kinds of printing, such as letter-press, copperplate and plain printing, and to the method of making such inks.

It is an object of my invention to obtain printing inks of improved printing properties. To this end, in an ink containing pigment, an oily substance as the binder, and water, I increase the percentage of oily substance beyond that required for the same ink without water.

Printer's inks for the above-mentioned and other kinds of printing have two principal constituents, viz. pigment of any desired color and an oily binder such as printer's varnish or lacquer.

The pigment not only acts as the coloring agent of the ink but also imparts to it the body required, while the binder presents the pigment in a suitable condition to the paper, wood, metal, glass, etc., to be printed and causes it to stick firmly to the material.

Light pigments require more binder than heavier ones and it has been found that inks with lighter pigments, with their higher percentage of binder, possess better printing properties than inks with heavier pigments. Thus, fine printing such as autotype printing cannot be performed with inks having a low percentage of binder while the result is excellent with a high percentage of binder.

It follows that the printing properties of inks are improved by increasing their percentage of oily substance or binder, obviously within the limits of a consistency at which the ink is still suitable for printing.

It has been found that by mixing pigment, oily substance and water perfectly homogenous printer's inks are obtained which do not undergo any variation, or give off water, when being ground and printed. Such inks are equal to normal inks as to water resistance, drying and consistency and may be prepared for printing with the agents required, exactly as in the case of normal inks, but their printing properties are much superior to those of the normal inks, because the oily substance and the water together act as the binder and the total percentage (oily substance plus water) of binder in the ink is substantially higher than in an ink without water.

For instance, in a book-printing ink, 10 parts of dry chrome yellow correspond to 4.5 parts of linseed-oil varnish, the same ink may contain as much as nine parts of binder if the binder consists of linseed-oil varnish and water, instead of varnish alone. The amount of binder has been doubled, and its percentage is 47 as against 31 in the ink without water. If it were attempted to increase the percentage of the binder by adding more linseed-oil varnish without water, the ink would become so thin that it could not be used for printing.

Quite homogenous printer's inks may be made from pigment, an oily substance, or substances, and water in various ways, for example, as follows:

1. The pigment is mixed with water and the oily substance, or substances, is added, preferably without an emulsifying agent until a perfectly homogenous paste is obtained which does not give off water when being ground and does not decompose even if kept for a longer period.

2. The pigment is mixed with the oily substance, or substances, and then water is added, preferably without an emulsifying agent.

3. The oily substance and the water are mixed, preferably without an emulsifying agent, and the binder (oily substance or substances, plus water) is ground with the pigment and a perfectly homogenous mixture is obtained which does not decompose.

Emulsifying agents are preferably dispensed with but may be added if their percentage is kept within such limits as not to detract from the character of the mixture, i. e., its similarity to a pure oil-varnish ink, without water.

The homogenous inks obtained according to my invention may be diluted with any desired amount of the oil-like or oily binder employed, or with volatile or non-volatile mineral oils or solvents, without separation of water or oily binder.

If a water-soluble binder is used, the colored water and the oily binder yield, without further preparation, a printer's ink which is ready for immediate use.

The term "oily substances" or "oily binders" includes vegetable and animal oils, varnishes obtained from such oils by boiling or blowing, solutions of metal driers in vegetable or animal oils, or in thickened oils of this kind, etc. I may also use solutions of colophony, hardened resins, ester resins, asphalt, wax, etc., in animal or vegetable oils, thickened or not, in mineral oils, and in volatile and non-volatile solvents, etc.

The manner in which my invention is reduced to practice, will be more fully understood from the following

Examples

I. 500 grammes of lacquer red P, pulverized, are mixed with 250 grammes of water, 450 grammes of pure linseed-oil varnish are added to the paste and the mixture is ground.

The ink obtained is suitable for lithography.

II. 500 grammes of chrome yellow, pulverized are ground with 300 grammes of pure linseed-oil varnish, and the ground mixture is worked with 150 grammes of water, until the mixture is quite homogenous.

The ink obtained is suitable for book printing.

III. 500 grammes of copper-plate printing lacquer of normal composition are worked into a homogenous mixture with 50 grammes of water. The mixture is ground with 100 grammes of red lacquer from pulverized lacquer red C and diluted with 50 grammes of toluol.

The ink obtained is suitable for copper-plate printing.

I claim:

A printing ink having the consistency and density for satisfactory working and consisting of a homogeneous mixture ground together in substantially the following proportions: 500 grams of dry pulverized pigment, 300 grams of pure lineseed oil varnish, and 150 grams of water.

KARL GROSS.